United States Patent
Pastore, Jr. et al.

(10) Patent No.: US 7,122,783 B1
(45) Date of Patent: Oct. 17, 2006

(54) SEISMIC ACTIVITY MONITOR BASED ON OPTICAL FIBER BRAGG GRATINGS

(75) Inventors: Robert A. Pastore, Jr., Freehold, NJ (US); John A. Kosinski, Neptune, NJ (US); Hong-Liang Cui, Basking Ridge, NJ (US); Yan Zhang, Newark, NJ (US); Zhifan Yin, North Arlington, NJ (US); Bingquan Chen, Hoboken, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/985,077

(22) Filed: Nov. 2, 2004

(51) Int. Cl.
*G01J 1/04* (2006.01)
*G01J 1/42* (2006.01)
*G01J 5/08* (2006.01)
*G01J 4/00* (2006.01)

(52) U.S. Cl. .......................... 250/227.14; 250/227.16; 250/227.18

(58) Field of Classification Search ........... 250/227.14, 250/227.18, 227.16
See application file for complete search history.

(56) References Cited

U.S. PATENT DOCUMENTS

| | | | | |
|---|---|---|---|---|
| 5,493,390 A | * | 2/1996 | Varasi et al. .................. | 356/32 |
| 5,675,674 A | * | 10/1997 | Weis ........................... | 385/12 |
| 5,760,391 A | * | 6/1998 | Narendran ............. | 250/227.14 |
| 6,597,822 B1 | * | 7/2003 | Moslehi et al. ................ | 385/13 |
| 6,751,367 B1 | * | 6/2004 | Moslehi et al. ................ | 385/13 |
| 2004/0071382 A1 | * | 4/2004 | Rich et al. ..................... | 385/12 |
| 2006/0038115 A1 | * | 2/2006 | Mass ...................... | 250/227.18 |

* cited by examiner

*Primary Examiner*—Georgia Epps
*Assistant Examiner*—Brian Livedalen
(74) *Attorney, Agent, or Firm*—Michael Zelenka; George B. Tereschuk (57) ABSTRACT

Fiber Bragg gratings (FBG) seismic activity sensors coupled in sensor arrays provide increased sensitivity to seismic activities, lower strain values and an absence of EMI allowing detection of troop and vehicle movements based on ground vibrations generating seismic signals. The FBG sensor head features a spring-mass configuration with a head surface, fiber optic cable and the FBG sensor attached to a spring that stretches during the acceleration of the mass. Waves propagating inside the earth and along the ground arriving at the sensor locations cause movement of the seismic activity sensors embedded in the ground and this movement induces an acceleration-dependent change in the FBG gratings placed on the sensors. In multiple sensor configurations, the cable will be connected to the other sensors in the network. FBG sensors, sensor arrays and sensor methods are provided in several embodiments.

44 Claims, 4 Drawing Sheets

SEISMIC ACTIVITY MONITOR BASED ON OPTICAL FIBER BRAGG GRATINGS

GOVERNMENT INTEREST

The invention described herein may be manufactured, used, and licensed by or for the United States Government for governmental purposes without payment to us of any royalties thereon.

FIELD OF THE INVENTION

The present invention relates to seismic monitoring apparatus and methods. More particularly, the present invention relates to sensor systems for monitoring seismic activity based on optical fiber Bragg Gratings.

BACKGROUND OF THE INVENTION

Troop and vehicle movements induce ground vibrations, with attendant weak seismic signals emanating from the location of such activity. These seismic signals are always produced at some level, and can be converted to valuable information for the detection and monitoring of movements within an area of interest when the monitoring technique is sufficiently sensitive. The prior art devices are unable to detect small seismic signals. The prior art devices are able to detect relatively large seismic signals from moving vehicles or perhaps large troop formations, but today's seismic detector cannot detect an individual enemy soldier or terrorist sneaking up on tiptoe to attack a perimeter guard. The prior art seismic detectors cannot detect small seismic signals because they generally lack adequate sensitivity. Prior art seismic detectors can adequately detect and measure seismic activity at strain values of about 10μ. Up until now, there is no available seismic detector that can detect and measure at the lower strain values of below 1.0 μ.

Another problem with prior art seismic detecting equipment has been the placement of the seismic sensor in such a way that the user is not observed or detected by the opposing forces. When prior art seismic sensors are placed in an array with a group of other sensors such an arrangement typically requires individual wire or wireless links between the detectors and a control station. Linking prior art detectors in this way suffers from a number of disadvantages, limitations and shortcomings including the equipment cost and a detectable signature, particularly when wireless links are used, along with difficulties caused by lack of adequate connector reliability. Thus, there has been a long-felt need for a seismic detector that can detect and measure at the lower strain values of about 1.0μ that does not suffer from the prior art's disadvantages, limitations and shortcomings of high equipment cost, detectable signature and lack of adequate connector reliability. Needless to say, if the seismic signals can be identified accurately in a remote and real-time mode, this would greatly aid intelligence gathering, battlefield monitoring and battle planning for military and law enforcement personnel, as well as numerous civilian activities such as earthquake detection and monitoring, subsurface geologic probing and mineral prospecting using controlled seismic events and precision monitoring systems.

The present invention answers the long-felt need for a seismic detector for lower strain values of about 0.5μ strain that does that does not suffer from the disadvantages, shortcomings and limitations of prior art arrangements by using multiple filter Bragg gratings seismic activity sensors in a simple, low-cost continuous fiber loop or strand. The first step of seismic monitoring is basic detection. To perform basic detection, a highly sensitive sensor is especially important to collect all the seismic waves efficiently. The fiber Bragg gratings seismic activity sensor and sensor array provide a number of advantages that are well suited for this purpose, and in general for military sensing and detection systems.

SUMMARY OF THE INVENTION

It is an object of the present invention to provide a fiber Bragg Gratings seismic activity sensor with increased sensitivity to terrestrial movements.

It is another object of the present invention to provide an array of fiber Bragg Gratings seismic activity sensors with lower strain values, increased sensitivity to terrestrial movements and an absence of electromagnetic interference (EMI).

It is yet another object of the present invention to provide an array of fiber Bragg gratings seismic activity sensors with lower strain values, increased sensitivity to terrestrial movements and an absence of EMI with multiple sensors arranged in a simple, low-cost continuous fiber loop.

These and other objects and advantages can now be attained by this invention's fiber Bragg gratings seismic activity sensors comprising a group of fiber Bragg grating (FBG) seismic sensor heads connected into a multiple sensor network with a simple, low-cost continuous fiber loop to provide lower strain values, increased sensitivity to terrestrial movements and an absence of EMI without suffering from the disadvantages, shortcomings and limitations of conventional prior art seismic detectors. In general terms, fiber Bragg Gratings (FBG) can induce permanent changes in the refractive index of an optical fiber by exposing its core to ultraviolet light, and when the exposure is made with an interferometer or through a phase mask it is possible to write a periodically varying refractive index grating within the core of the fiber. The reflectivity, bandwidth and central wavelength of Bragg structures are defined by the period and length of the phase mask and exposure time used. The FBG is considered to be a spring-mass mechanical system with an acceleration that is pre-positional to displacement in accordance with Hooke's Law. The FBG seismic sensor of the present invention has numerous applications for monitoring seismic activity, including the detection and monitoring of both natural seismic phenomena such as earthquakes and man-made seismic events such as the movements of individuals, troops and vehicles in a military or law enforcement environment.

The FBG seismic sensor, sensor array and methods of the present invention provide numerous advantages over conventional seismic sensors including improved sensitivity, a higher signal-to-noise ratio leading to better detection, measurement, characterization and geo-location capability, a simple, rugged, low-cost, multiple sensor strand and loop array arrangement that saves size, weight, power, cost and complexity and provides increased reliability and field-service lifetime.

The FBG seismic sensor of the present invention is a smaller and much more sensitive monitor than conventional prior art sensors, and it can be fabricated to be immune from the deleterious effects of EMI. The FBG seismic sensor can detect seismic signals with extremely high sensitivity with dynamic strain sensitivity better than $10^{-2}\mu$ strain. Further, such a fiber optic sensor is lightweight, compact and has very low power consumption. The diameter of a bare fiber is only 125 μm and most fiber Bragg gratings are only one to several centimeters long. An FBG seismic sensor is also resistant to corrosion and fatigue due to the inherent properties of optical fiber glass. Based on these and other advantageous features, the FBG seismic sensor can be easily installed and hidden even in harsh battlefield environments. This invention's FBG seismic sensor is passive, which eliminates any requirements to provide electrical power to the sensor head, and it transfers optical signals that are confined to optical cables, therefore it is intrinsically immune to EMI and has no detectable radio frequency emissions or thermal signatures to compare to the background environment. The FBG sensor is appropriate for multiple-sensor applications because many of these gratings can either be deployed in series or parallel. In this respect, many of the multiplexing techniques, including wavelength division multiplexing (WDM), time division multiplexing (TDM), and spatial division multiplexing (SDM), along with the necessary components and devices recently developed in the telecommunication industry can be directly brought to bear here, which makes it possible for networked or arrayed FBG sensors to cover a large area and provide additional information such as the three-dimensional position coordinates and velocity vectors of the object under detection. Thus, it is possible to deploy hundreds of FBG sensors in a given area to continuously monitor seismic activities of either natural or unnatural origin. These advantages of the FBG fiber optic sensor make it an ideal candidate for a seismic activity monitoring system that does not suffer from the disadvantages, limitations and shortcomings of prior art seismic sensors.

Connecting this invention's detectors in a continuous fiber loop eliminates both the wireless signature and connector difficulties encountered with prior art devices. The optical filter Bragg gratings seismic sensors connected in a continuous fiber loop also solves other prior art problems by deploying sensors with a significantly minimized electronic signature and simplified interconnections. The present invention contemplates both a single FBG seismic sensor and an array of FBG seismic sensors configured for numerous seismic detecting applications and a method for sensing seismic disturbances in real-time with multiple FBG sensor gratings. Potential uses of the present invention include monitoring several categories of seismic activity such as the detection and monitoring of earthquakes and other naturally occurring seismic phenomena, the detection and monitoring of individual, troop, and vehicle movements by military or police forces and subsurface geologic probing and mineral prospecting using controlled seismic events and precision monitoring systems.

DETAILED DESCRIPTION OF THE DRAWINGS

Figure 1:
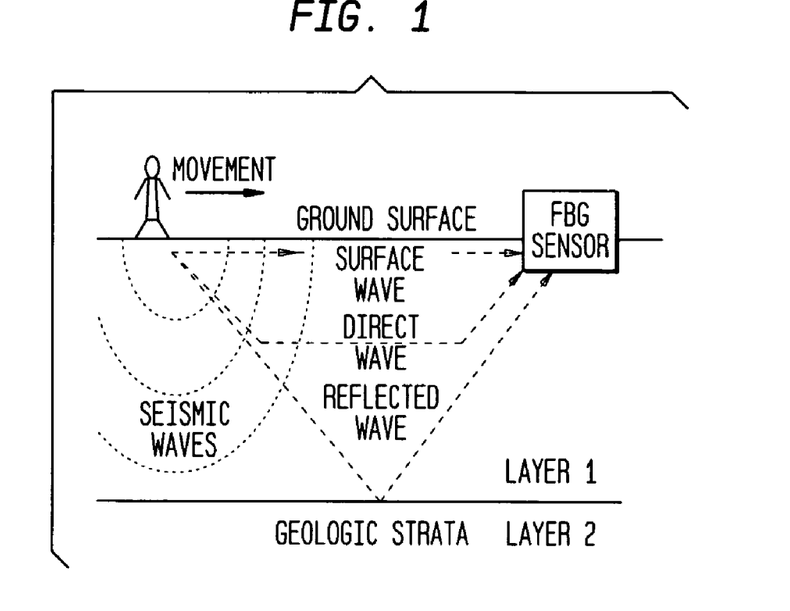
FIG. 1 is a conceptual diagram illustrating the basic principle of using an FBG sensor for seismic wave detection.

Referring now to the drawings, FIG. 1 illustrates the basic principle of seismic detection used in this invention's FBG seismic sensor apparatus. Ground vibrations created by the movement of troops or vehicles act as sources of various seismic signals. The seismic waves propagate from the location of the human or vehicular activity, and spread out in all directions along spherical wave fronts. Some of the waves will propagate along the surface as a direct stress wave. Others will travel through the earth's interior. When these interior waves encounter the interface of two layers with different physical properties, a portion of the wave will reflect back toward the surface. Waves from all possible interior directions together with surface waves propagating along the ground surface may arrive at the sensor locations and cause movement of the sensors embedded in the ground, with this movement inducing an acceleration-dependent change in the FBG gratings. The properties of the seismic waveforms recorded by the detection system are closely related to the source activity that caused the ground vibrations. Thus, by detecting and analyzing the frequency, amplitude, arrival time and other information from the seismic waveforms, it is possible to identify many details of the source of the ground vibrations, which for a military scenario would include information such as the speed, invasion direction and number of troops and vehicles. In a law enforcement environment the same parameters could provide information such as the speed, direction and number of intruders.

Figure 2:
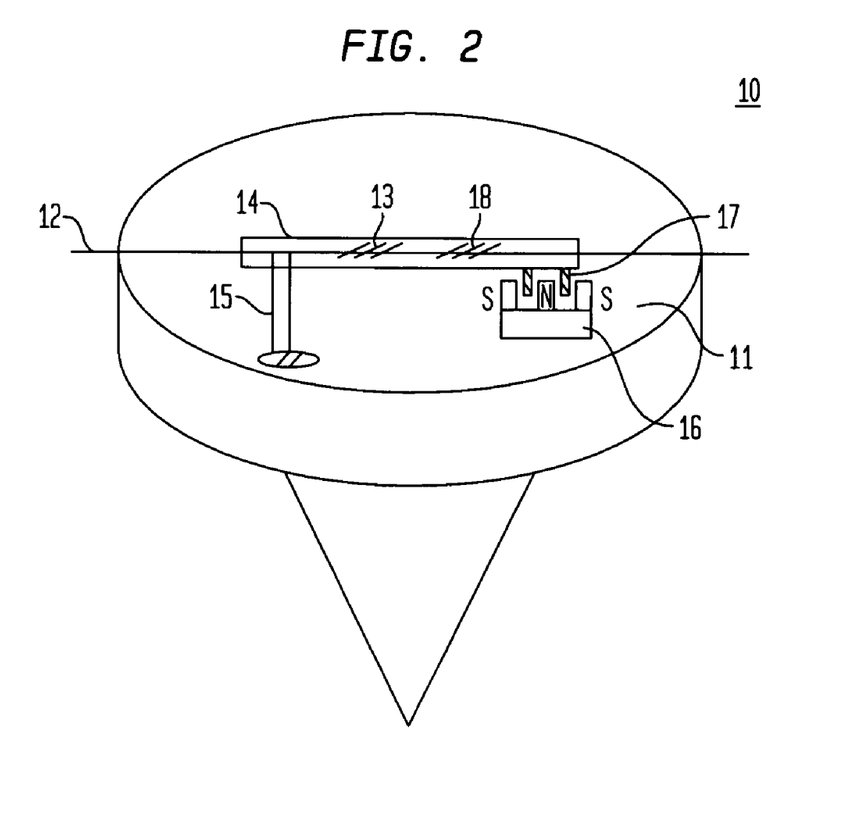
FIG. 2 is a conceptual diagram of an FBG seismic sensor head in accordance with the present invention.

FIG. 2 depicts an FBG sensor head 10 that acts as one sensor in an array of FBG seismic sensors depicted in subsequent drawings. The FBG sensor head 10 having a spring-mass configuration comprises a head surface 11, fiber optic cable 12 and the FBG sensor 13. The FBG sensor 13 is directly attached to the spring 14 that stretches or compresses during the acceleration of the mass. This is also the only element needs to be coupled into the earth on-site. Fiber optic cable 12 is connected to a ground terminal 15 and to FBG sensor 13. Ground terminal 15 is attached to the cover of the FBG sensor 13, which is coupled to the ground. In multiple sensor configurations of the present invention, the cable 12 will be connected to the other sensors in the network.

By adjusting the mechanical parameters of the spring/mass configuration, the natural response frequency of the system can be mechanically tuned within an adequate range in order to best match to the spectral characteristics of the seismic wave sources. The FBG sensor head 10 has a compact size and a low mass of only a few grams, obtaining great advantages in that the sensor can be easily embedded and hidden in the battlefield. A means for damping 16 is also included on the FBG sensor head 10. Critical damping is provided so that the mass/spring system will return quickly to its ready state after detecting a signal (<1 μs). This critical damping is achieved in either of two ways. One approach is shown in FIG. 2, where a Faraday induction loop 17 and a permanent magnet 18 provide the needed damping means. The small, induced current from the damping means 16 is, of course, properly shielded so that no electromagnetic signal is emitted from the sensor head 10. A second approach for damping utilizes viscous oil, which has the advantage of not requiring electromagnetic shielding.

In addition to the desired strain signal, the FBG sensor 13 is also sensitive to undesired environmental temperature variations due to thermal expansion of the fiber. The present invention includes temperature compensation in order to identify and then separate out this undesirable influence. Integrating the FBG sensor 13 and demodulator grating 18 in close proximity to one another on the surface of sensor head 11 accomplishes this. The FBG seismic sensor 10 is coupled to both strains and temperature changes in the sensor head 11 where acceleration is to be measured. The demodulator grating 18 is de-coupled from the strains and influenced only by temperature changes. Both gratings have the same temperature coefficients to ensure that the peak position of the FBG seismic sensor 10 is always self-referenced to the temperature-sensitive demodulator grating 18.

In operation, the FBG seismic sensor head 10 responds to the seismic wave by means of an acceleration-induced strain change of the FBG sensor 13. The basic sensing principle for the optical grating is that the strain variation can be transformed into the fiber Bragg grating wavelength shift through the mechanical design. The sensitivity of the Bragg wavelength shift in response to strain on the grating is expressed as:

$$\Delta\lambda_B = \lambda_B G_\epsilon \epsilon$$

Here, $\Delta\lambda_B$ is the change in central wavelength of the FBG due to the strain, $\lambda_B$ is the Bragg wavelength of the FBG, $G_\epsilon$ is a fiber optic axial strain gauge factor, and $\epsilon$ is the relative change in strain. For example, at the Bragg wavelength of 1550 nm, $G_\epsilon$ is 0.78 for silica fibers, and the wavelength strain factor is ~1 pm/$\mu\epsilon$. Thus, an imposed strain of 1000 $\mu_\epsilon$ would lead to a 1 nm wavelength shift of an FBG sensor.

Figure 3:
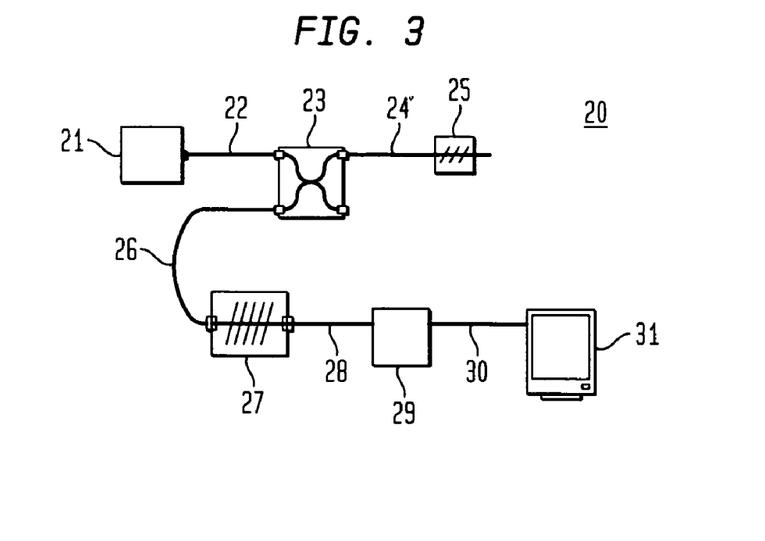
FIG. 3 is a schematic diagram of a one-channel demodulation system in accordance with the present invention.

Referring now to FIG. 3, there is depicted a single-line demodulation system 20 that converts the wavelength shift into a light intensity variation, and subsequently to an analog electronic signal processed by electronic filters and amplifiers in accordance with the present invention. Thus, with this invention's single-line demodulation system, very small strain changes can be discerned readily through the detection of wavelength shifts in an FBG sensor. The single-line demodulation system 20 comprises a light source 21, an FBG sensor 25, a demodulator grating 27, a 3-dB optical coupler 23 and other signal detection and processing hardware. Light from a broadband light source 21, for example a central wavelength at 1550 nm and a spectral width of 40 nm, optical power 20 mW, is launched into a single mode fiber 22, and then enters one of the ports of the 3 dB coupler 23. One portion of the light goes to the FBG sensor 25 and is reflected from the FGB sensor 25 back to the demodulator grating 27. Both of the gratings have the same central wavelength under static conditions, with a grating central wavelength of 1550 nm. The FBG sensor 25 having a wavelength shift under strain now functions as an optical reflector, while the demodulator grating 27 operates as an optical filter without tension. In this way, the transmitted light intensity is directly related to the dynamic strain variations of the sensor grating of FBG sensor 25. The demodulated light 26 is transmitted from the 3 dB coupler 23 to the demodulating grating 27. The transmitted light 28 of the demodulator grating 27 exits into a photo receiver 29, where the optical signal is converted into an analog electrical signal 30. The output analog electrical signal 30 from the photo receiver 29 goes through an electronic band-pass filter and amplifier and is collected by a means for data processing 31 with control software that plots the collected data in real time. One data acquisition board used in a laboratory model of the present invention has a sampling rate of 2 MHz per channel for eight analog input channels.

Variations of the single-line demodulation system 20 of the present invention include the data processing means 31 being a computer, the data processing means 31 having suitable software programs, as well as suitable variations to the FBG sensor 25. Other variations include the optical coupler 23 having multiple ports, the light source 21 being a broadband light source, the transmitted optical signal being a demodulated optical signal, the seismic disturbances being a plurality of small amplitude sound waves propagating in the ground, the sensor head having a damping mechanism, the software programs including software for data acquisition, analysis, damping control, gain flattening and communication. When multiple sensors are positioned in the detecting area or in a sensor array network with numerous sensor gratings, each with a different frequency, the data processing means 31 can determine a greatest wavelength shift among the sensor gratings to identify a zone of intrusion within the detecting area. In an array of eight analog input channels, the sensor array can be configured with a sampling rate of 2 MHz for each of said channels.

FBG sensors are ideal candidates for multiplexing, which makes it possible to deploy a large-scale network sensor array in the battlefield or other area of operations. Multiplexing technologies known from the telecommunications industry include wavelength division multiplexing (WDM), time division multiplexing (TDM) and spatial division multiplexing (SDM). These can be applied either individually or in different configurations. These multiplexing techniques permit maximizing the advantages offered by each technology, reducing system cost and minimizing several potential shortcomings and drawbacks. These economies are especially important for seismic wave detection applications where thousands of sensors must be used to constitute a large array. An FBG seismic sensor system with multiplexed sensors is preferred.

Figure 4:
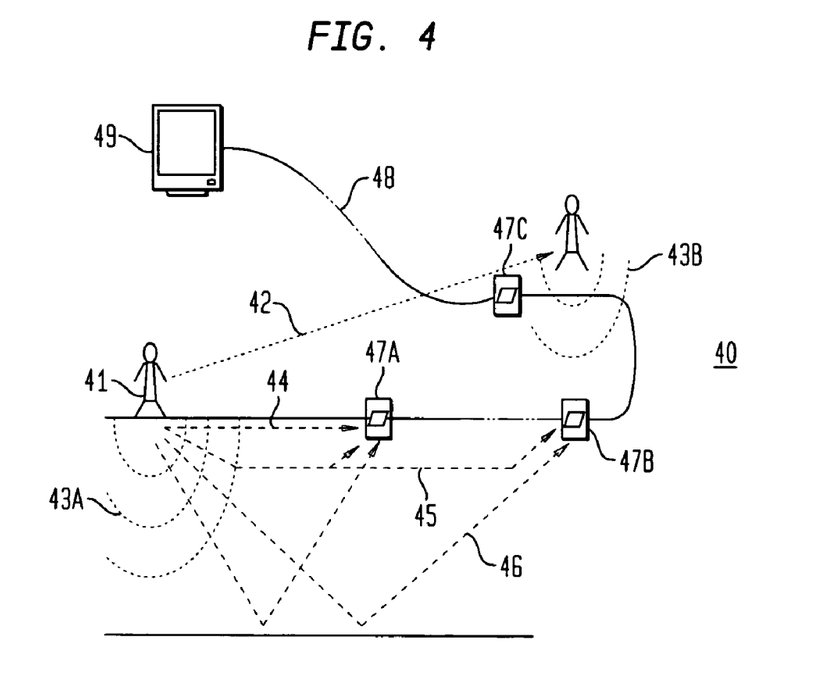
FIG. 4 is a conceptual diagram of single line FBG seismic sensor system in accordance with the present invention.

FIG. 4 is a conceptual diagram of single line FBG seismic sensor system 40 with multiple sensors in accordance with the present invention. In accordance with the single line FBG seismic sensor system 40 of the present invention, multiple gratings formed in the same fiber are interrogated separately using either wavelength division multiplexing techniques or time division multiplexing techniques. Referring now to FIG. 4, the sensor system 40 is shown in operation with an intruder 41 causing seismic waves 43A in a first position that generate surface wave 44, direct wave 45 and reflected wave 46. The waves 43–46 are then detected by multiple FBG sensors 47A and 47B. When intruder 41 proceeds along the path indicated by arrow 42, his direction and speed of motion will result in a series of responses from the array of FBG seismic sensors 47A, 47B and 47C. By analyzing the responses from a large number of such sensors at different locations, which are then transmitted along transmission line 48 to data processing means 49, the user can perform direction finding of potential intrusions or geo-location based on time difference of arrival (TDOA) or other multi-sensor techniques. The number of intruders, troops, vehicles and their speed of movement can also be recognized from the amplitude and frequency profiles of the seismic waveforms 43A and 43B. The transmission line 48 between the multiple FBG seismic sensor heads 47A–47C and the signal detection electronics are implemented by commercial optical cable and do not emit EMI radiation to the environment. As shown in FIG. 4, the signal data is collected by the FBG seismic sensor head at its specific location 47A–47C and then transmitted back to the data processing means 49 at some distance away. The information is processed and recorded in real time by the data processing means 49. In this way the seismic sensor detection system 40 may be operated remotely to guarantee safety of operation in the battlefield. Many of the variations of the single line system may also apply to this embodiment.

Figure 5:
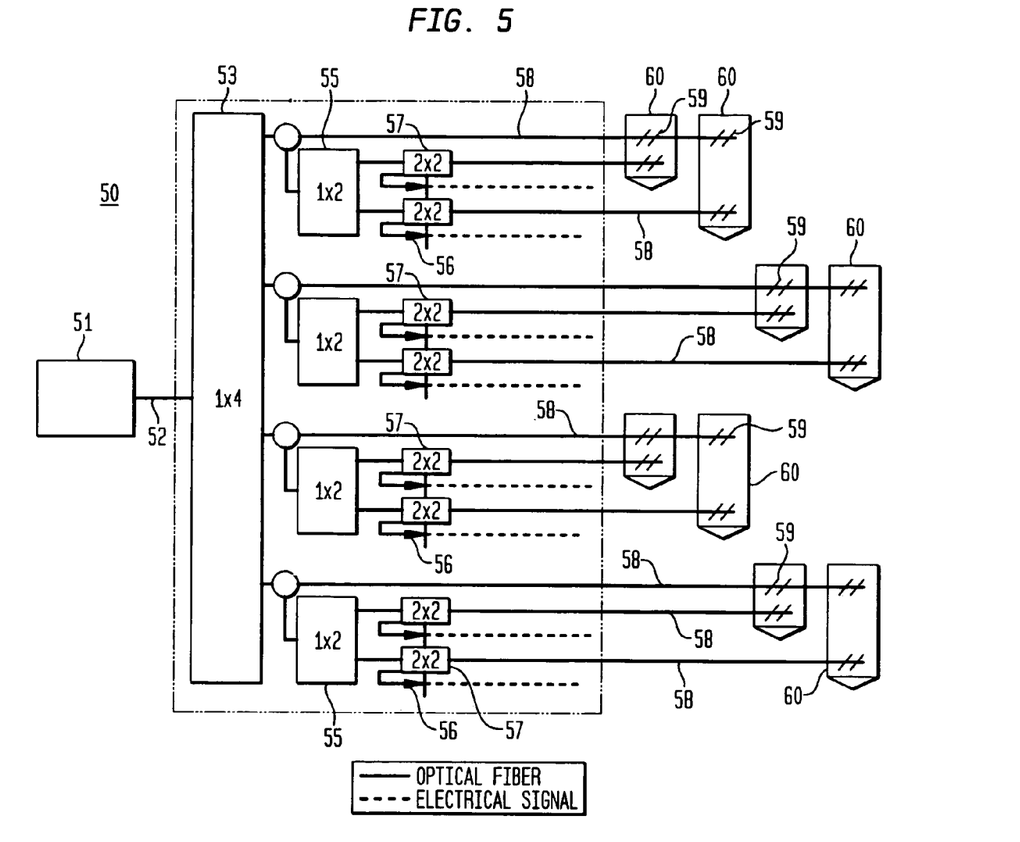
FIG. 5 is a schematic diagram of an eight-channel FBG seismic sensor system in accordance with the present invention.

FIG. 5 is a schematic diagram of an eight-channel FBG seismic sensor system 50, which is one preferred embodiment of the present invention that is essentially a variation of the FIG. 4 three-sensor conceptual diagram. This preferred embodiment comprises multiple fiber lines connected by an optical switch or a 1×n coupler, i.e. multiple individual lines are multiplexed using spatial division multiplexing. Each individual line is its own sensor cluster containing many gratings written at different wavelengths along an optical cable hundreds or thousands of meters long so that along each fiber, the individual grating sensor are multiplexed using wavelength division multiplexing. In an alternate embodiment, the exact location of each sensor is carefully chosen such that time division multiplexing may be used in conjunction with a fixed wavelength laser.

Referring now to FIG. 5, the eight-channel FBG seismic sensor system 50 comprises a light source 51, a large 1×4 optical fiber switch 53, small 1×2 optical fiber switches 55, a group of photodetectors 56, a number of 2×2 optical couplers 57 and a group of FBG gratings 59 disposed on FBG sensors 60. The FBG gratings 59 are fabricated with slightly different dimensions that correspond to different frequencies allowing the data processing means, not shown in this drawing, to determine the largest wavelength shift and thus identify which FBG sensor 60 is closest to the zone of intrusion. Although this FBG seismic sensor system 50 comprises particular sizes of large optical fiber switches 53, small optical fiber switches 55 and optical couplers 57, numerous other sizes and configurations are also within the contemplation of the present invention. Other variations include a sensor network with as many as several hundred channels, as well as many of the variations from the other embodiments of the present invention.

Figure 6A:
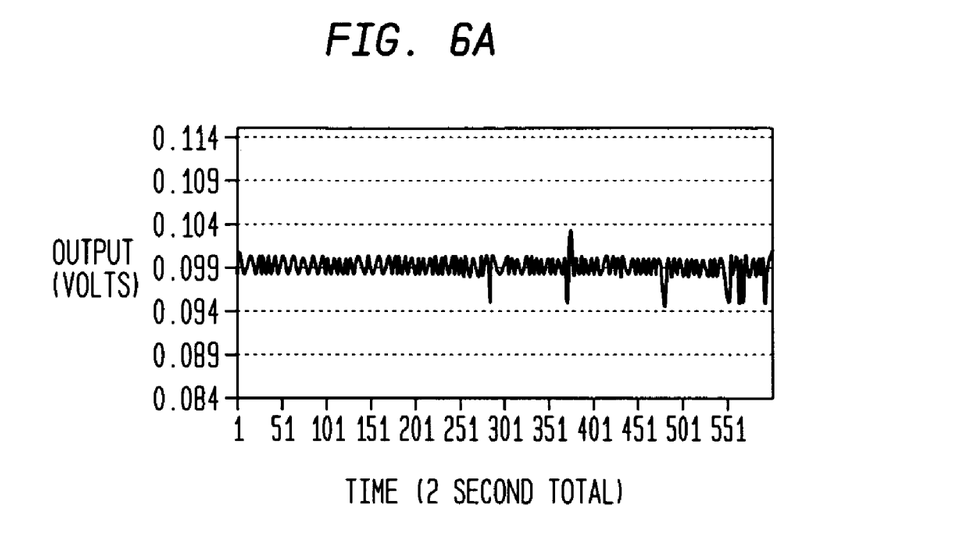
FIGS. 6A–6B are charts depicting examples of the FBG sensor time-domain responses comparing background noise and a man jogging in accordance with the present invention.
Figure 6B:
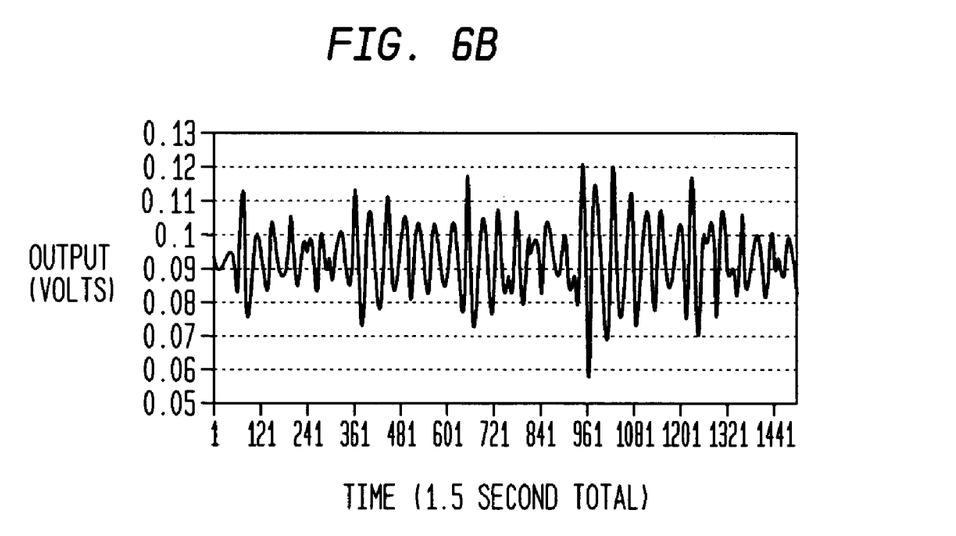

A series of experiments were carried out in an outdoor environment. The FBG sensor head was coupled into the earth by the roadside, with people passing by as the seismic wave source. Several kinds of man-made activities such as walking, jumping, and running were monitored and recorded. FIGS. 6A and 6B show examples of the FBG sensor time-domain response for one such case with data taken in real time. The value on the y-axis is the output electrical voltage signal of the system. FIG. 6A is a chart depicting the background noise and FIG. 6B is a chart depicting the detection of the signal from a man running just a few meters from the sensor head. A significant difference was observed before and after this event, indicating that the sensor functions properly. The good signal to noise ratio of the detection system also can be observed from these charts. A high dynamic range of 80 dB is easily achieved in this system. The natural response frequency of the FBG sensor detection system was designed to be 25 Hz, corresponding to the most common ground wave frequency due to such activities. However, this can easily be tuned to a frequency range from a few Hz to 300 Hz with no change to the optical subsystem and minimal changes to the electronic subsystem. Mechanical damping and gain flattening were also incorporated in the experiment. Gain flattening is achieved within the electronic subsystem by incorporating a feedback loop to regulate the signal gain.

The present invention also encompasses a method for sensing seismic disturbances in real-time with a plurality of fiber sensor gratings, comprising the steps of forming a fiber sensor grating with an identical central wavelength to a demodulator grating, placing the sensor grating on a sensor head, positioning the sensor head in a detecting area, transmitting a light beam from a light source through the detecting area to an optical coupler, directing a portion of the light beam to the sensor grating, generating a strain resulting in a wavelength shift in the sensor grating and strain variations from a seismic disturbances in the detecting area, with the wavelength shift causing the sensor grating to function as an optical reflector, reflecting back the portion of the light beam from the sensor grating into the demodulator grating, generating an optical signal transmitted to a means for photo receiving, the transmitted optical signal having an intensity related to the strain variations, converting the transmitted optical signal to an analog electrical signal in the photo receiver means, sending the analog signal through an electronic band-pass filter and an amplifier, collecting the analog signal in a means for data processing and plotting the plurality of seismic disturbances in real time. Many of the variations that are possible with the other embodiments of this invention may also apply to this method.

These embodiments of the present invention are intended to be illustrative and not limiting with respect to the variety of possible embodiments. It is to be further understood that other features and modifications to the foregoing detailed description of the seismic sensor systems are all considered to be within the contemplation of the present invention, which is not limited by this detailed description. Those skilled in the art will readily appreciate that any number of configurations of the present invention and numerous modifications and combinations of materials, components, geometrical arrangements and dimensions can achieve the results described herein, without departing from the spirit and scope of this invention. Accordingly, the present invention should not be limited by the foregoing description, but only by the appended claims.

We claim:

1. A seismic sensor system, comprising:
   a sensor head with a fiber Bragg gating is positioned in a detecting area, said sensor head having a head surface, a fiber optic cable and a means for damping;
   a light source transmits a light beam through said detecting area to an optical coupler, a portion of said light beam is directed to said fiber Bragg grating;
   said fiber optic cable being a part of a continuous fiber loop;
   fiber Bragg grating and a demodulator grating having an identical central wavelength under static conditions;
   a plurality of terrestrial seismic disturbances in the earth and along the ground in said detecting area generates a strain and a plurality of sound waves, said strain causing a wavelength shift in said fiber Bragg grating and a plurality of strain variations, said wavelength shift causing said fiber Bragg grating to function as an optical reflector;
   said portion of the light beam being reflected back from said fiber Bragg grating into said demodulator grating generates an optical signal transmitted through said continuous fiber loop to a means for photo receiving, said transmitted optical signal having an intensity related to said plurality of strain variations;
   a multitude of said sensor heads, each having its own fiber Bragg grating with a different frequency, are connected to said continuous fiber loop, said damping means causes said sensor head to rapidly return to a ready state after detecting a signal;

said photo receiver means converts said transmitted optical signal to an analog electrical signal sent through an electronic band-pass filter and an amplifier, said analog electrical signal being collected by a means for data processing to plot said plurality of terrestrial seismic disturbances in real time, without emitting a detectable electronic signature, said multitude of sensor heads, covering said detecting area, provide a group of three-dimensional position coordinates, a plurality of velocity vectors of a moving object in said detecting area and a sensitivity of at least 1.0 μstrain;

said system being tunable; and a plurality of data being collected by said data processing means with a software control program plots a plurality of collected data.

2. The seismic sensor system, as recited in claim 1, further comprising said optical coupler having a plurality of ports.

3. The seismic sensor system, as recited in claim 2, further comprising said light source being a broadband light source.

4. The seismic sensor system, as recited in claim 3, further comprising said broadband light source transmits said light beam to a single mode fiber.

5. The seismic sensor system, as recited in claim 4, further comprising said demodulator grating functioning as an optical filter without tension.

6. The seismic sensor system, as recited in claim 5, further comprising said sensor grating and said demodulator grating having a grating central wavelength of 1550 nm.

7. The seismic sensor system, as recited in claim 6, further comprising a plurality of software programs including software for data acquisition, analysis, damping control, gain flattening and communication.

8. The seismic sensor system, as recited in claim 7, further comprising said system being a single-line seismic sensor system.

9. The seismic sensor system, as recited in claim 8, further comprising said multitude of sensor heads being configured into a sensor array network.

10. The seismic sensor system, as recited in claim 9, further comprising deploying said sensor array network to detect military movements.

11. The seismic sensor system, as recited in claim 10, further comprising
said data processing means determines a greatest wavelength shift among said sensor gratings to identify a zone of intrusion within said detecting area.

12. The seismic sensor system, as recited in claim 9, further comprising deploying said multitude of sensor heads with a division multiplexing technique.

13. The seismic sensor system, as recited in claim 9, further comprising:
an array of eight analog input channels;
said array having a sampling rate of 2 MHz for each of said channels; and
an increased sensitivity of about 0.5μ strain.

14. A single-line seismic sensor system, comprising:
a sensor head with a fiber sensor grating is positioned in a detecting area, said sensor head having a head surface, a fiber optic cable and a means for damping;
a light source transmits a light beam through said detecting area to an optical coupler, a portion of said light beam is directed to said fiber Bragg grating;
said fiber optic cable being a part of a continuous fiber loop;
said fiber Bragg grating and a demodulator grating having an identical central wavelength under static conditions;

a plurality of terrestrial seismic disturbances in the earth and along the ground in said detecting area generates a strain and a plurality of sound waves, said strain causing wavelength shift in said fiber Bragg grating and a plurality of strain variations, said wavelength shift causing said fiber Bragg grating to function as an optical reflector;

said portion of the light beam being reflected back from said fiber Bragg grating into said demodulator grating generates an optical signal transmitted through said continuous loop to a means for photo receiving, said transmitted optical signal having an intensity related to said plurality of strain variations;

a multitude of said sensor heads, each having its own fiber Bragg grating with a different frequency, are connected to said continuous fiber loop, said damping means causes said multitude of sensor heads to rapidly return to a ready state after detecting a signal;

said photo receiver means converts said transmitted optical signal to an analog electrical signal sent through an electronic band-pass filter and an amplifier, said analog electrical signal being collected by a means for data processing to plot said plurality of terrestrial seismic disturbances in real time, without emitting a detectable electronic signature, said multitude of sensor heads, covering said detecting area, provide a group of three-dimensional position coordinates, a plurality of velocity vectors of a moving object in said detecting area and a sensitivity of at least 1.0 μstrain;

said system being tunable; and a plurality of data being collected by said data processing means with a software control program plots a plurality of collected data.

15. The single-line seismic sensor system, as recited in claim 14, further comprising said optical coupler having a plurality of ports.

16. The single-line seismic sensor system, as recited in claim 15, further comprising said light source being a broadband light source.

17. The single-line seismic sensor system, as recited in claim 16, further comprising said broadband light source transmits said light beam to a single mode fiber.

18. The single-line seismic sensor system, as recited in claim 17, further comprising said demodulator grating functioning as an optical filter without tension.

19. The single-line seismic sensor system, as recited in claim 18, further comprising said sensor gratings and said demodulator grating having a grating central wavelength of 1550 nm.

20. The single-line seismic sensor system, as recited in claim 19, further comprising an increased sensitivity of about 0.5μ strain.

21. A seismic sensor array system, comprising:
a plurality of sensor heads, each having a fiber Bragg grating, are positioned in a detecting area, each of said plurality of sensor heads having a head surface, a fiber optic cable and a means for damping;
a light source transmits a light beam through said detecting area to a plurality of optical couplers, a portion of said light beam is directed to each of said plurality of fiber Bragg gratings;
said fiber optic cable being a part of a continuous loop;
said plurality of fiber Bragg gratings and a demodulator grating having an identical central wavelength under static conditions;
each of said plurality of fiber Bragg gratings having a different frequency is connected to said continuous fiber loop, said damping means causes said plurality of sensor heads to rapidly return to a ready state after detecting a signal;

a plurality of terrestrial seismic disturbances in the earth and along the ground in said detecting area generates a strain and a plurality of sound waves, said strain causing a wavelength shift in each of said plurality of fiber Bragg gratings and a plurality of strain variations, said wavelength shifts causing said plurality of fiber Bragg gratings to function as optical reflectors;

said portion of the light beam being reflected back from each of said plurality of fiber Bragg gratings into said demodulator grating generates a plurality of optical signals transmitted through said continuous fiber loop to a means for photo receiving, said plurality of transmitted optical signals having an intensity related to said plurality of strain variations;

said photo receiver means converts said plurality of transmitted optical signals to a plurality of analog electrical signals sent through an electronic band-pass filter, said analog electrical signal being collected by a means for data processing to plot said plurality of terrestrial seismic disturbances in real time and to determine a greatest wavelength shift among said sensor gratings and identify a zone of intrusion within said detecting area, without emitting a detectable electronic signature, said plurality of sensor heads, covering a wider detecting area, provide a group of three-dimensional position coordinates, a plurality of velocity vectors of a moving object in said wider detecting area and a sensitivity of at least $1.0\mu$ strain;

said system being tunable; and a plurality of data being collected by said data processing means with a software control program plots a plurality of collected data.

22. The seismic sensor array system, as recited in claim 21, further comprising each of said plurality of optical couplers having a plurality of ports.

23. The seismic sensor array system, as recited in claim 22, further comprising said light source being a broadband light source.

24. The seismic sensor array system, as recited in claim 23, further comprising said broadband light source transmits said light beam to a single mode fiber.

25. The seismic sensor array system, as recited in claim 24, further comprising said demodulator grating functioning as an optical filter without tension.

26. The seismic sensor array system, as recited in claim 25, further comprising said plurality of sensor heads being configured into a sensor array network.

27. The seismic sensor array system, as recited in claim 26, further comprising said sensor gratings and said demodulator grating having a grating central wavelength of 1550 nm.

28. The seismic sensor array system, as recited in claim 27, wherein said plurality of software programs include software for data acquisition, analysis, damping control, gain flattening and communication.

29. The seismic sensor array system, as recited in claim 28, further comprising deploying said sensor array network to detect military movements.

30. The seismic sensor array system, as recited in claim 28, further comprising deploying said sensor array system with a wavelength division multiplexing technique.

31. The seismic sensor array system, as recited in claim 30, further comprising:

an array of eight analog input channels;

said array having a sampling rate of 2 MHz for each of said channels; and an increased sensitivity of about $0.5\mu$ strain.

32. A method for sensing seismic disturbances in real-time with a plurality of fiber sensor gratings, comprising the steps of:

forming a fiber Bragg grating with an identical central wavelength to a demodulator grating under static conditions;

forming a plurality of said fiber Bragg gratings;

placing each of said plurality of fiber Bragg gratings on a sensor head, each of said plurality of sensor heads having a head surface, a fiber optic cable and a means for damping;

positioning said plurality of said sensor heads in a detecting area;

transmitting a light beam from a light source through said detecting area to an optical coupler, a portion of said light beam is directed to at least one of said plurality of fiber Bragg gratings;

connecting said plurality of sensor heads into a continuous fiber loop;

generating a strain and a plurality of sound waves, said strain causing a wavelength shift in said plurality of fiber Bragg gratings and a plurality of strain variations from a plurality of terrestrial seismic disturbances in the earth and along the ground in said detecting area, said wavelength shift causing said plurality of fiber Bragg gratings to function as optical reflectors;

reflecting back said portion of the light beam from said plurality of fiber Bragg gratings into said demodulator grating;

generating an optical signal transmitted through said continuous fiber loop to a means for photo receiving, said transmitted optical signal having an intensity related to said plurality of strain variations;

rapidly returning said plurality of sensor heads to a ready state after detecting a signal with said damping means;

converting said transmitted optical signal to an analog electrical signal in said photo receiver means;

sending said analog electrical signal through an electronic band-pass filter and an amplifier;

collecting said analog electrical signal in a means for data processing;

plotting said plurality of terrestrial seismic disturbances in real time, without emitting a detectable electronic signature, said plurality of sensor heads, covering a wider detecting area, provide a group of three-dimensional position coordinates, a plurality of velocity vectors of a moving object in said wider detecting area and a sensitivity of at least $1.0\mu$ strain;

tuning said system; and collecting a plurality of data by said data processing means with a software control program plotting a plurality of collected data.

33. The method for sensing seismic disturbances in real-time with the plurality of fiber sensor gratings, as recited in claim 32, further comprising the step of forming said optical coupler with a plurality of ports.

34. The method for sensing seismic disturbances in real-time with the plurality of fiber sensor gratings, as recited in claim 33, further comprising the step of providing a broadband light source.

35. The method for sensing seismic disturbances in real-time with the plurality of fiber sensor gratings, as recited in claim 34, further comprising the step of transmitting said light beam from said broadband light source to a single mode fiber.

36. The method for sensing seismic disturbances in real-time with the plurality of fiber sensor gratings, as recited in claim 35, further comprising the step of providing said demodulator grating to function as an optical filter without tension.

37. The method for sensing seismic disturbances in real-time with the plurality of fiber sensor gratings, as recited in claim 36, further comprising the step of providing said sensor grating and said demodulator grating with a grating central wavelength of 1550 nm.

38. The method for sensing seismic disturbances in real-time with the plurality of fiber sensor gratings, as recited in claim 37, further comprising the step of providing a plurality of software programs including software for data acquisition, analysis, damping control, gain flattening and communication.

39. The method for sensing seismic disturbances in real-time with the plurality of fiber sensor gratings, as recited in claim 38, further comprising the step of configuring a single-line seismic sensor system.

40. The method for sensing seismic disturbances in real-time with the plurality of fiber sensor gratings, as recited in claim 38, further comprising the step of configuring said multitude of sensor heads into a sensor array network.

41. The method for sensing seismic disturbances in real-time with the plurality of fiber sensor gratings, as recited in claim 40, further comprising the step of deploying said sensor array network to detect military movements.

42. The method for sensing seismic disturbances in real-time with the plurality of fiber sensor gratings, as recited in claim 41, further comprising the step of
    allowing said data processing means to determine a greatest wavelength shift among said sensor gratings to identify a zone of intrusion within said detecting area.

43. The method for sensing seismic disturbances in real-time with the plurality of fiber sensor gratings, as recited in claim 40, further comprising the step of deploying said multitude of sensor heads with a division multiplexing technique.

44. The method for sensing seismic disturbances in real-time with the plurality of fiber sensor gratings, as recited in claim 40, further comprising the steps of:
    forming an array of eight analog input channels;
    providing said array with a sampling rate of 2 MHz for each of said channels; and
    an increased sensitivity of about $0.5\mu$ strain.

* * * * *